United States Patent
Yockman et al.

(10) Patent No.: US 8,829,109 B2
(45) Date of Patent: Sep. 9, 2014

(54) CLEAVABLE MODIFICATIONS TO REDUCIBLE POLY(AMIDO ETHYLENIMINE)S TO ENHANCE NUCLEOTIDE DELIVERY

(75) Inventors: James W. Yockman, Salt Lake City, UT (US); Jonathan Brumbach, Salt Lake City, UT (US); Lane V. Christensen, Bridgewater, NJ (US); Sung Wan Kim, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 389 days.

(21) Appl. No.: 12/266,980

(22) Filed: Nov. 7, 2008

(65) Prior Publication Data
US 2009/0142842 A1 Jun. 4, 2009

Related U.S. Application Data

(60) Provisional application No. 61/002,283, filed on Nov. 7, 2007.

(51) Int. Cl.
| | | |
|---|---|---|
| A61K 47/48 | (2006.01) | |
| C08G 63/48 | (2006.01) | |
| C08G 63/91 | (2006.01) | |
| C08L 89/00 | (2006.01) | |
| C12N 15/00 | (2006.01) | |
| C08G 65/334 | (2006.01) | |
| C08G 73/02 | (2006.01) | |
| C08G 65/333 | (2006.01) | |
| C08G 65/332 | (2006.01) | |

(52) U.S. Cl.
CPC ........ *C08G 65/3322* (2013.01); *C08G 65/3348* (2013.01); *C08G 73/0253* (2013.01); *C08L 2205/05* (2013.01); *C08G 65/3346* (2013.01); *C08G 65/3342* (2013.01); *C08G 65/33324* (2013.01); *C08G 65/33306* (2013.01); *C08G 73/028* (2013.01)
USPC .......................... 525/54.1; 435/455; 435/320.1

(58) Field of Classification Search
None
See application file for complete search history.

(56) References Cited

U.S. PATENT DOCUMENTS

| | | | |
|---|---|---|---|
| 6,413,941 | B1 | 7/2002 | Garnett |
| 6,586,524 | B2 * | 7/2003 | Sagara ........................ 525/54.11 |
| 7,153,905 | B2 | 12/2006 | Banerjee |
| 7,534,878 | B2 * | 5/2009 | Liu et al. ...................... 536/24.5 |
| 2003/0147958 | A1 | 8/2003 | Ahn |
| 2004/0204377 | A1 | 10/2004 | Rana |
| 2006/0147376 | A1 | 7/2006 | Yu et al. |
| 2007/0041934 | A1 | 2/2007 | William et al. |
| 2007/0269891 | A9 | 11/2007 | Tanaka et al. |
| 2007/0298006 | A1 | 12/2007 | Tomalia et al. |

OTHER PUBLICATIONS

Christensen, et al. (2006) Bioconjugate Chemistry, 17: 1233-40.*
Suh, et al. (2002) Molecular Therapy, 6(5): 664-72.*
Brumach, et al. (2012) "Functional Properties and Biodistribution of poly(triethylenetetramine/cystamine bisacrylamide) and poly(triethylenetetramine/cystamine bisacrylamide)-poly(ethylene glycol) mixtures formed with nucleic acid", Journal of Controlled Release, 159(1): 111-19.*
Brumbach, et al. (2010) "Mixtures of Poly(triethylenetetramine/cystamine bisacrylamide) and Poly(triethylenetetramine/cystamine bisacrylamide)-g-poly(ethylene glycol) for Improved Gene Delivery", Bioconjugate Chemistry, 21: 1753-61.*
Ji Hoon Jeong, Lane V. Christensen, James W. Yockman, Zhiyuan Zhong, Johan F.J. Engbersen, Won Jong Kim, Jan Feijen, Sung Wan Kim, Reducible Poly(amido ethylenimine) Directed to Enhance RNA Interference, 28 Biomaterials 1912-1917 (2007).
Lane V. Christensen, Chien-Wen Chang, Won Jon Kim, Sung Wan Kim, Reducible Poly(amido ethylenimine)s Designed for Triggered Intracellular Gene Delivery, 17 Bioconjugate Chem. 1233-1240 (2006).
Wonhee Suh, Sang-Oh Han, Lei Yu, Sung Wan Kim, An Angiogenic, Endothelial-Cell-Targeted Polymeric Gene Carrier, 6 Molecular Therapy 664-672 (2002).
Motoi Oishi, Shigeki Sasaki, Yukio Nagasaki, Kazunori Katoaka, pH-Responsive Oligodeoxynucleotide (ODN)-Poly(Ethylene Glycol) Conjugate through Acid-Labile B-Thiopropionate Linkage: Preparation and Polyion Complex Micelle Formation, 4 Biomacromolecules 1426-1432 (2003).
Chao Lin, Zhiyuan Zhong, Martin C. Lok, Xulin Jiang, Wim E. Hennink, Jan Feijen, Johan F.J. Engbersen, Linear Poly(amido amine)s with Secondary and Tertiary Amino Groups and Variable Amounts of Disulfide Linkages: Synthesis and in vitro Gene Transfer Properties, 116 J. Controlled Rel. 130-137 (2006).
Elisa Emilitri, Elisabetta Ranucci, Paolo Ferruti, New Poly(amidoamine)s Containing Disulfide Linkages in Their Main Chain, 43 J. Polymer Sci, Part A 1404-1416 (2005).
D Schaffert, E. Wagner, Gene Therapy Progress and Prospects: Synthetic Polymer-Based Systems, 15 Gene Therapy 1131-1138 (2008).
Tae-Il Kim, Jung-Un Baek, Cheng Zhe Bai, Jong-Sang Park, Synthesis of Novel Poly(amido ethylenimine) (Pameim) Dendrimer and Its Self-Assembly with Plasmid DNA, 27 Bull. Korean Chem. Soc. 1894-1896 (2006).

(Continued)

*Primary Examiner* — Robert M Kelly
(74) *Attorney, Agent, or Firm* — Clayton, Howarth & Cannon, P.C.

(57) ABSTRACT

Improved poly(amido ethylenimine) copolymers for gene delivery are disclosed. One illustrative embodiment includes polyethylene glycol (PEG) covalently bonded to a branched poly(triethyenetetramine/cystamine bisacrylamide) copolymer (poly(TETA/CBA)). The polyethylene glycol can be linear or branched. Another illustrative embodiment includes an RGD peptide covalently bonded to the poly(TETA/CBA)-PEG conjugate. Still another illustrative embodiment includes a method of using these compositions for transfecting a cell with a nucleic acid.

15 Claims, 13 Drawing Sheets

(56) References Cited

OTHER PUBLICATIONS

Chao Lin, Zhiyuan Zhong, Martin C. Lok, Xulin Jiang, Wim E. Hennink, Jan Feijen, Johan F.J. Engbersen, Novel Bioreducible Poly(amido amine)s for Highly Efficient Gene Delivery, 18 Bioconnugate Chem. 138-145 (2006).

Martin Meyer, Ernst Wagner, pH-Responsive Shielding of Non-Viral Gene Vectors, 3 Expert Opinion on Drug Delivery 563-571 (2006).

* cited by examiner

```
                        SEQUENCE LISTING

<160> NUMBER OF SEQ ID NOS: 1

<210> SEQ ID NO 1
<211> LENGTH: 10
<212> TYPE: PRT
<213> ORGANISM: Homo sapiens

<400> SEQUENCE: 1

Ala Cys Asp Cys Arg Gly Asp Cys Phe Cys
1               5                   10
```

CLEAVABLE MODIFICATIONS TO REDUCIBLE POLY(AMIDO ETHYLENIMINE)S TO ENHANCE NUCLEOTIDE DELIVERY

CROSS-REFERENCE TO RELATED APPLICATIONS

This application claims the benefit of U.S. Provisional Application No. 61/002,283, filed Nov. 7, 2007, which is hereby incorporated by reference, except in the event any portion of the provisional application is inconsistent with this application, this application supercedes the provisional application.

STATEMENT REGARDING FEDERALLY SPONSORED RESEARCH OR DEVELOPMENT

This invention was made with government support under grant no. HL065477 from the National Institutes of Health. The government has certain rights in the invention.

BACKGROUND OF THE INVENTION

This invention relates to gene delivery. More particularly, this invention relates to nonviral gene delivery carriers.

Gene therapy has broad potential in treatment of human genetic and acquired diseases through the delivery and application of therapeutic gene-based drugs. The use of safe, efficient and controllable gene carriers is a requirement for the success of clinical gene therapy. R. C. Mulligan, The basic science of gene therapy, 260 Science 926-932 (1993); I. M. Verma & N. Somia, Gene therapy-promises, problems and prospects, 389 Nature 239-242 (1997). Although viral vectors are very efficient in gene delivery, their potential safety and immunogenicity concerns raise their risk in clinical applications. C. Baum et al., Mutagenesis and oncogenesis by chromosomal insertion of gene transfer vectors, 17 Hum. Gene Ther. 253-263 (2006). As an alternative to viral vectors, cationic polymers such as poly(L-lysine) (PLL), poly(ethylenimine) (PEI), poly(amidoamine) dendrimers, and cationic liposomes have been synthesized as gene delivery carriers. The advantages of these cationic polymer carriers include safety, stability, large DNA and RNA loading capacity, and easy and large-scale production. S. Li & L. Huang, Nonviral gene therapy: promises and challenges, 7 Gene Ther. 31-34 (2000); F. Liu et al., Non-immunostimulatory nonviral vectors, 18 Faseb J. 1779-1781 (2004); T. Niidome & L. Huang, Gene therapy progress and prospects: nonviral vectors, 9 Gene Ther. 1647-1652 (2002). The cationic polymers can condense negatively charged DNA into nanosized particles through electrostatic interactions, and the polymer/pDNA polyplexes can enter cells via endocytosis. Y. W. Cho et al., Polycation gene delivery systems: escape from endosomes to cytosol, 55 J. Pharm. Pharmacol. 721-734 (2003); L. De Laporte et al., Design of modular non-viral gene therapy vectors, 27 Biomaterials 947-954 (2006); E. Piskin et al., Gene delivery: intelligent but just at the beginning, 15 J. Biomater. Sci. Polym. Ed. 1182-1202 (2004). As a result, the polymers can protect pDNA from nuclease degradation and facilitate cellular uptake to induce high gene transfection. O. Boussif et al., A versatile vector for gene and oligonucleotide transfer into cells in culture and in vivo: polyethylenimine, 92 Proc. Nat'l Acad. Sci. USA 7297-7301 (1995); D. W. Pack et al., Design and development of polymers for gene delivery, 4 Nat. Rev. Drug. Discov. 581-593 (2005).

The currently available cationic polymers, however, have significant cytotoxicity concerns, mostly due to their poor biocompatibility and non-degradability under physiological conditions.

Therefore, while prior nonviral gene delivery carriers are known and are generally suitable for their limited purposes, they possess certain inherent deficiencies that detract from their overall utility in gene therapy.

In view of the foregoing, it will be appreciated that providing improved carriers to enhance nucleotide delivery would be a significant advancement in the art.

BRIEF SUMMARY OF THE INVENTION

An illustrative embodiment of the present invention comprises a composition comprising polyethylene glycol covalently bonded to poly[$H_2N$—($CH_2$—$CH_2$—N)$_n$—H/CBA]. In illustrative embodiments of the present invention, n is 1, 2, or 3. In some illustrative embodiments of the present invention, the polyethylene glycol is linear, but in other illustrative embodiments, the polyethylene glycol is branched. The polyethylene glycol typically has a molecular weight of about 1,000 to about 50,000 and, more typically has a molecular weight of about 2,000 to about 25,000. In one illustrative embodiment of the invention, the polyethylene glycol has a molecular weight of about 3,400. The poly[$H_2N$—($CH_2$—$CH_2$—N)$_n$—H/CBA] typically has a molecular weight of about 1,000 to about 25,000. However, the molecular weights of the poly[$H_2N$—($CH_2$—$CH_2$—N)$_n$—H/CBA] and the polyethylene glycol are limited only by their functionality as carriers. In some illustrative embodiments of the present invention, the composition further comprises an RGD peptide covalently bonded to the polyethylene glycol. An illustrative example of an RGD peptide is shown in SEQ ID NO:1.

Another illustrative embodiment of the present invention comprises a complex comprising a nucleic acid ionically bonded to a composition comprising polyethylene glycol covalently bonded to poly[$H_2N$—($CH_2$—$CH_2$—N)$_n$—H/CBA]. Illustrative nucleic acids comprise plasmids, siRNAs, and oligonucleotides.

Still another illustrative embodiment of the present invention comprises a method of transfecting a cell with a selected nucleic acid, the method comprising contacting the cell with a complex comprising the selected nucleic acid ionically bonded to a composition comprising polyethylene glycol covalently bonded to poly[$H_2N$—($CH_2$—$CH_2$—N)$_n$—H/CBA] such that the complex enters the cell.

A still further illustrative embodiment of the invention comprises a solid support coated with a composition comprising polyethylene glycol covalently bonded to poly[$H_2N$—($CH_2$—$CH_2$—N)$_n$—H/CBA]. The polyethylene glycol may be linear or branched. In certain illustrative embodiments of the invention, n is 1, 2, or 3. Moreover, in additional illustrative embodiments, an RGD peptide may be bonded to the polyethylene glycol.

DETAILED DESCRIPTION

Before the present improvement to reducible poly(amido ethylenimine)s (SS-PAEIs) and methods are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified materials or steps and those that do not materially affect the basic and novel characteristic or characteristics of the claimed invention.

As used herein, "SS-PAEI" means poly(amido ethylenimine) containing reducible disulfide bonds; "TETA" means triethylenetetramine; and "CBA" means N,N'-cystamine bisacrylamide.

Figure 1:
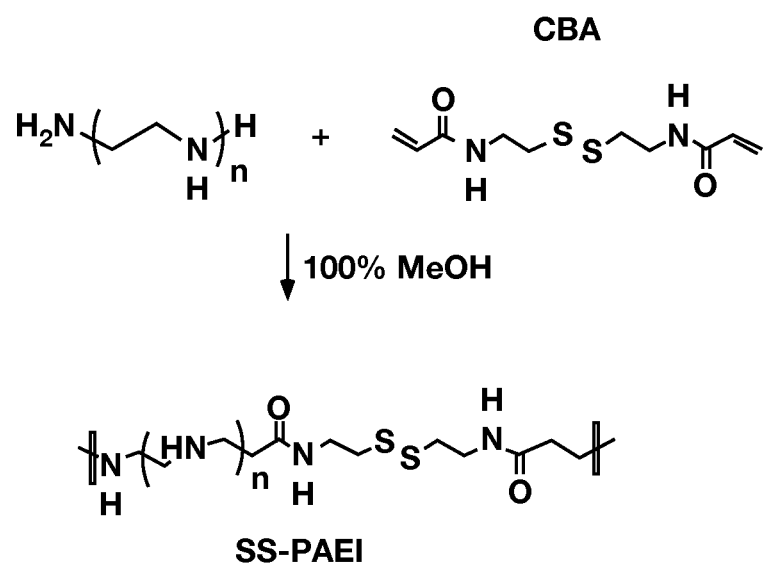
FIG. 1 shows a scheme for synthesis of poly[$H_2N$—($CH_2$—$CH_2$—N)$_n$—H/CBA] according to the present invention.

Reducible poly(amido ethylenimine)s (SS-PAEIs) are a class of nonviral carrier used for the delivery of nucleic acids. L. V. Christensen et al., Reducible Poly(amido ethylenimine)s Designed for Triggered Intracellular Gene Delivery, 17 Bioconjugate Chem. 1233-1240 (2006). The synthesis of these types of polymers using Michael addition chemistry between polyamine monomers and cystamine bisacrylamide (CBA) is shown in FIG. 1. The resultant polymers have been shown to mediate effective transfection efficiency of therapeutic plasmid DNA as well as siRNA. L. V. Christensen, C. W. Chang, J. W. Yockman, et al., Reducible poly(amido ethylendiamine) for hypoxia-inducible VEGF delivery, 118 J. Control. Rel. 254-261 (2007); J. Hoon Jeong, L. V. Christensen, J. W. Yockman, Z. Zhong, J. F. J. Engbersen, W. J. Kim, J. Feijen, S. W. Kim, Reducible poly(amido ethylenimine) directed to enhance RNA interference, 28 Biomaterials 1912-1917 (2007). These polymers take advantage of the redox potential between the extracellular and the intracellular environment by a triggered release mechanism delivering the nucleic acid of interest into the cytoplasmic compartment of the cell. Such characteristics have a significant advantage over traditional noncleavable or hydrolysable polymers used to date for nonviral gene delivery.

A clear advantage is seen with the delivery of oligonucleotides (such as antisense oligonucleotides and siRNA) that only need to be delivered into the cytoplasm for their effects to be demonstrated. Traditional noncleavable polymers typically remain condensed within the cytoplasm once released from the endosomal compartment due to their high electrostatic interactions. This condensation of the therapeutic nucleotides prevents their use in the host machinery for transcription or translational inhibition. However, the SS-PAEIs are reduced within the cytoplasm by reductive proteins/enzymes, i.e., glutathione-S-transferase (GSH), releasing the therapeutic nucleotides and significantly increasing the amount of available nucleotides for transcription or inhibition of translation.

Until recently, these polymers have been used for direct delivery via injection in vivo. Disadvantages of systemic delivery, including undesired interactions with negatively charged plasma proteins and nonspecific degradation during circulation, has led to the construction of a polymeric system that can overcome the main issues confronted by nonviral gene delivery to date—delivery. Most importantly, reactive linkages between the polymer and the additional polymeric structures an/or targeting moieties are crucial to allow for complete reduction of the nucleotide/polymeric complexes within the cytoplasm. It has been shown that stable linkages of polymeric structures may decrease transfection efficiency within cells, whether by inhibiting release of the nucleotides or hindering movement into the nucleus. M. Meyer & E. Wagner, pH-Responsive shielding of non-viral gene vectors, 3 Expert Opin. Drug Deliv. 563-571 (2006). As this reduction of the SS-PAEIs is crucial for effective nucleotide delivery, effective modifications of SS-PAEIs that protect against negative interactions in vivo and deliver nucleic acids to the desired targeted region are disclosed herein.

To improve the poly(triethylenetetramine cystamine-bisacrylamide) (poly(TETA/CBA)) polymer for in vivo applications via systemic administration, the polymer may be sterically stabilized using a hydrophilic PEG spacer that may, or may not, contain an accompanying tissue specific targeting moiety, such as RGD. Moreover, previous gene delivery studies have demonstrated that in vivo gene transfer is highest with high molecular weight, branched polymers. An example of a co-polymer exhibiting these characteristics is $PEG_{3400}$-bPEI25k. Therefore, a high molecular weight, branched poly(TETA/CBA) ("bTETA/CBA") has been synthesized and has been conjugated to $PEG_{3400}$ and $PEG_{3400}$-RGD to derive the resulting copolymers termed poly(TETA/CBA)-$PEG_{3400}$ and poly(TETA/CBA)-$PEG_{3400}$-RGD.

Another illustrative embodiment of the present invention comprises a solid support coated with a composition comprising polyethylene glycol covalently bonded to poly(TETA/CBA). The polyethylene glycol can be linear or branched. In addition, an RGD peptide can be bonded to the polyethylene glycol. Illustratively, the solid support can be a dish bottom, a multiwell plate, or a continuous surface. The solid support can be glass, plastics (such as polytetrafluoroethylene (PTFE), polyvinylidenedifluoride, polystyrene, polycarbonate, or polypropylene), silicon, metal (such as gold), membranes (such as nitrocellulose, methylcellulose, PTFE, or cellulose), paper, biomaterials (such as protein, gelatin, or agar), tissues (such as skin, endothelial tissue, bone, or cartilage), or minerals (such as hydroxyapatite or graphite), slides (such as glass or poly-L-lysine coated slides) or wells of a multiwell or microtiter plate. Typical solid support materials include polystyrene resin, epoxy resin, or glass.

The coating amount is typically about 0.1 to about 100 $\mu g/cm^2$. The composition is coated on the surface of the solid support. The composition can be mixed with a matrix, such as proteins, peptides, polysaccharides, or polymers. The protein can be gelatin, collagen, bovine serum albumin, or any other protein that can be used in affixing proteins to a surface. The polymers can be hydrogels, copolymers, non-degradable or biodegradable polymers, and biocompatible materials. The polysaccharide can be any compound that can form a membrane and coat the polymer, such as chitosan. Reagents, such as cytotoxicity reductive reagents, cell binding reagents, cell growing reagents, cell stimulating reagents, or cell inhibiting reagents and compounds for culturing specific cells, can also be affixed to the solid surface along with the composition.

Illustratively, a gelatin-composition mixture, comprising composition and gelatin in an appropriate solvent, such as water, may be affixed to the solid surface. A cell culture reagent, such as fibronectin, collagen, salts, sugars, protein, or peptides may also be present in the gelatin-polymer mixture. The mixture is spread evenly on a surface of the solid support, such as a slide or a multiwell plate. The resulting product is allowed to dry completely under suitable conditions such that the gelatin-polymer mixture is affixed to the solid support. For example, the resulting product can be dried at selected temperatures or humidities, or in a vacuum desiccator.

EXAMPLE 1

Poly(TETA/CBA) was synthesized according to the scheme illustrated in FIG. 1 and described in L. V. Christensen et al., supra, at 30° C., 40° C., and 50° C.

Figure 2:
FIG. 2 shows the results of MALDI-TOF analysis showing the degree of branching of poly(TETA/CBA) synthesized at either 30° C. or 40° C.
Figure 3:
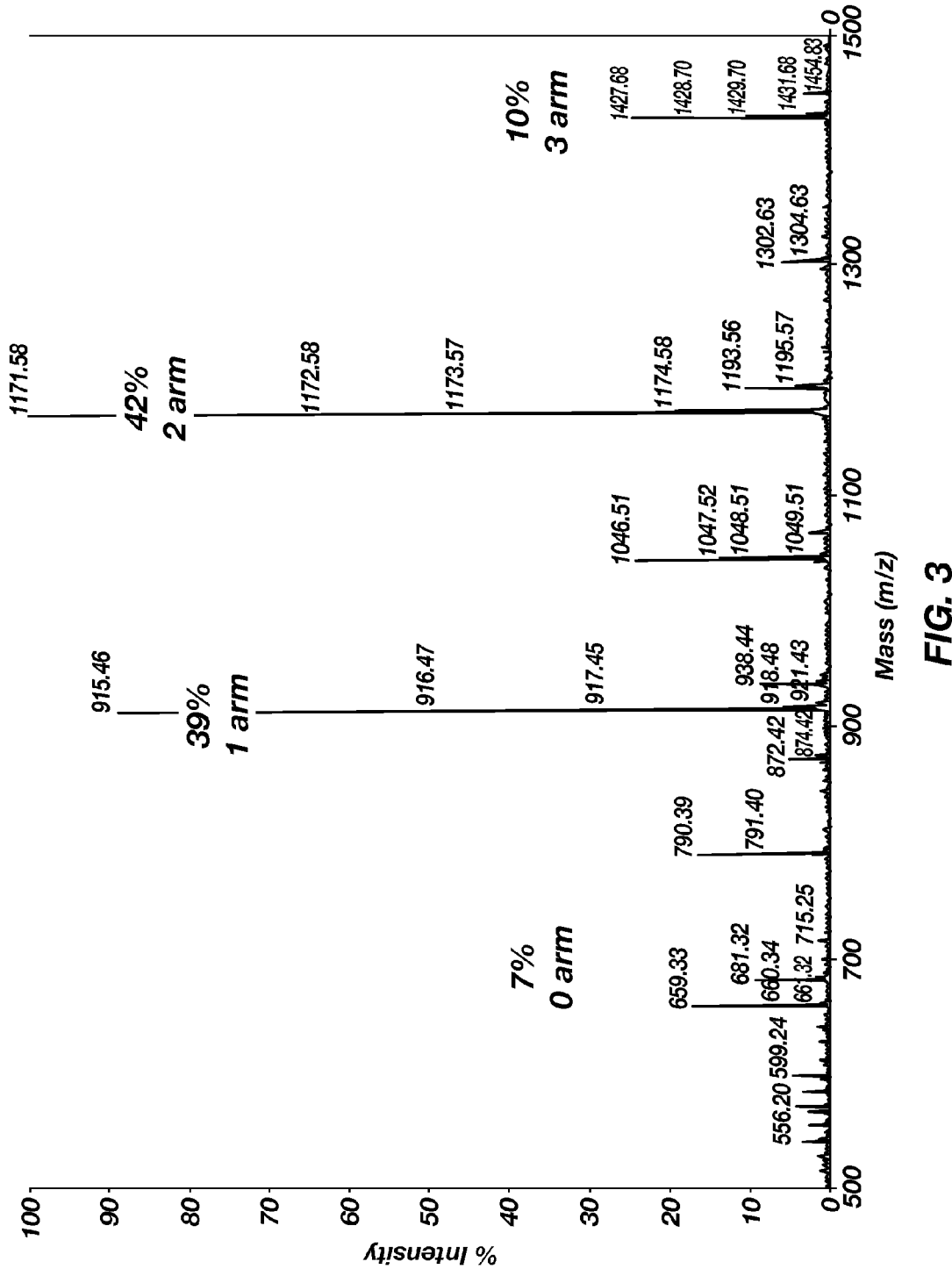
FIG. 3 shows the results of MALDI-TOF analysis showing the degree of branching of poly(TETA/CBA) synthesized at 50° C.

The degree of branching of poly(TETA/CBA) prepared according to this example was characterized by matrix-assisted laser desorption/ionization time of flight (MALDI-TOF) mass spectrometry. The results show that poly(TETA/CBA) branching was about 90%. Synthesis at 30° C. or 40° C. (FIG. 2) resulted in about 90% of poly(TETA/CBA) repeat units containing at least one branched chain (arm), with the other 10% being linear. Within this population, about 60% contained one arm, and about 30% contained two arms. Synthesis at 50° C. (FIG. 3) resulted in a more dense architecture, with about 7% of the copolymers being linear, about 40% containing one arm, about 40% containing two arms, and about 10% containing three arms.

EXAMPLE 2

Figure 4:
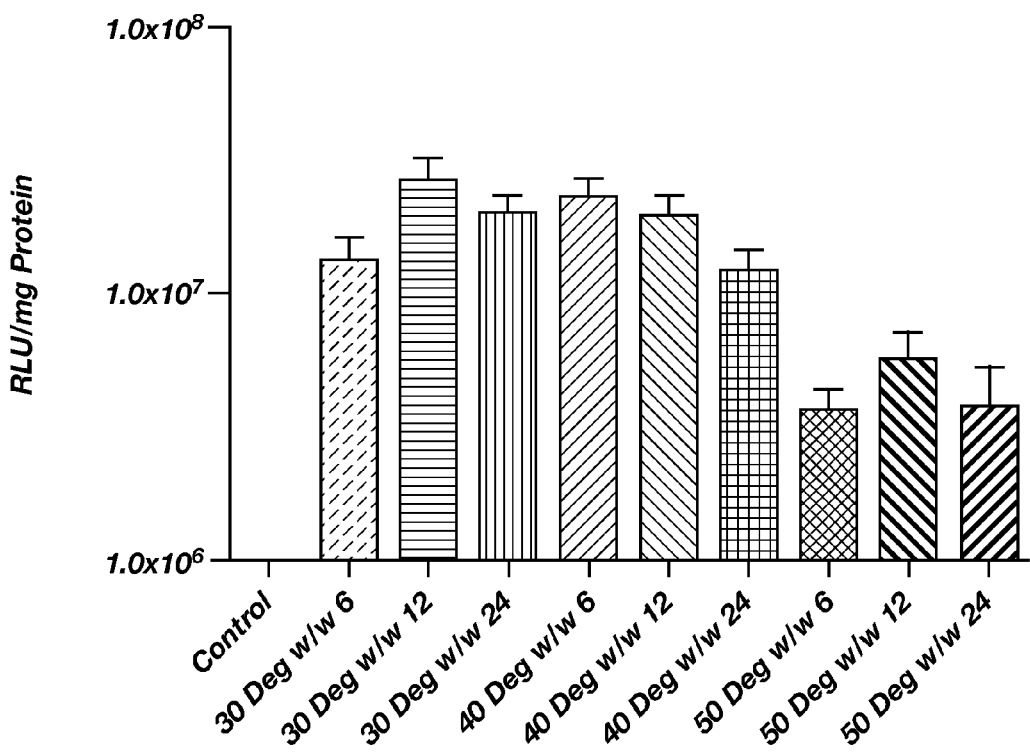
FIG. 4 shows the effect of polymer architecture on transfection efficiency in H9c2 cells. From left to right, results are shown for a no-carrier control (i.e., reporter plasmid only), a complex of poly(TETA/CBA) and reporter plasmid wherein the poly(TETA/CBA) was synthesized at 30° C. and the weight ratio of carrier to reporter plasmid is 6 ("30 Deg w/w 6"), 30 Deg w/w 12, 30 Dec w/w 24, 40 Deg w/w 6, 40 Deg w/w 12, 40 Deg w/w 24, 50 Deg w/w 6, 50 Deg w/w 12, and 50 Deg w/w 24.

Transfection with poly(TETA/CBA) copolymers was evaluated in H9c2 cells using the plasmid, pBLuc, as a reporter. Cells were maintained in DMEM containing 10% FBS, streptomycin (100 µg/mL) and penicillin (100 units/mL) at 37° C. in a humidified atmosphere with 5% $CO_2$. Cells were seeded 24 hrs prior to transfection in 24-well plates at initial densities of $4.0 \times 10^4$ cells/well. DNA was complexed with the poly(TETA/CBA) polymers at polymer/pBLuc w/w ratios of 6, 12, and 24. Controls contained no poly(TETA/CBA) polymer. Complexes were made in HEPES buffer and incubated for 30 min before use. At the time of transfection, the medium in each well was replaced with fresh serum-free medium. Polyplexes (0.5 µg DNA/well) were incubated with the cells for 4 hrs at 37° C. The medium was then replaced with 500 µL of fresh complete medium and cells were incubated for additional 44 hrs. The cells were then washed with pre-warmed PBS, treated with 200 µL cell lysis buffer and subjected to a freezing-thawing cycle. Cellular debris was removed by centrifugation at 14,000 g for 5 min. The luciferase activity in cell lysates (25 µL) was measured using a luciferase assay kit (100 µL luciferase assay buffer) on a luminometer (Dynex Technologies Inc., Chantilly, Va.). The relative luminescence unit (RLU) of luciferase expression was normalized against protein concentration in the cell extracts, measured by a BCA protein assay kit (Pierce, Rockford, Ill.). All transfection assays were carried out in triplicate. Results are shown in FIG. 4. The more highly branched architecture reduced transfection efficiency as compared to the less-branched architecture.

EXAMPLE 3

Figure 5:
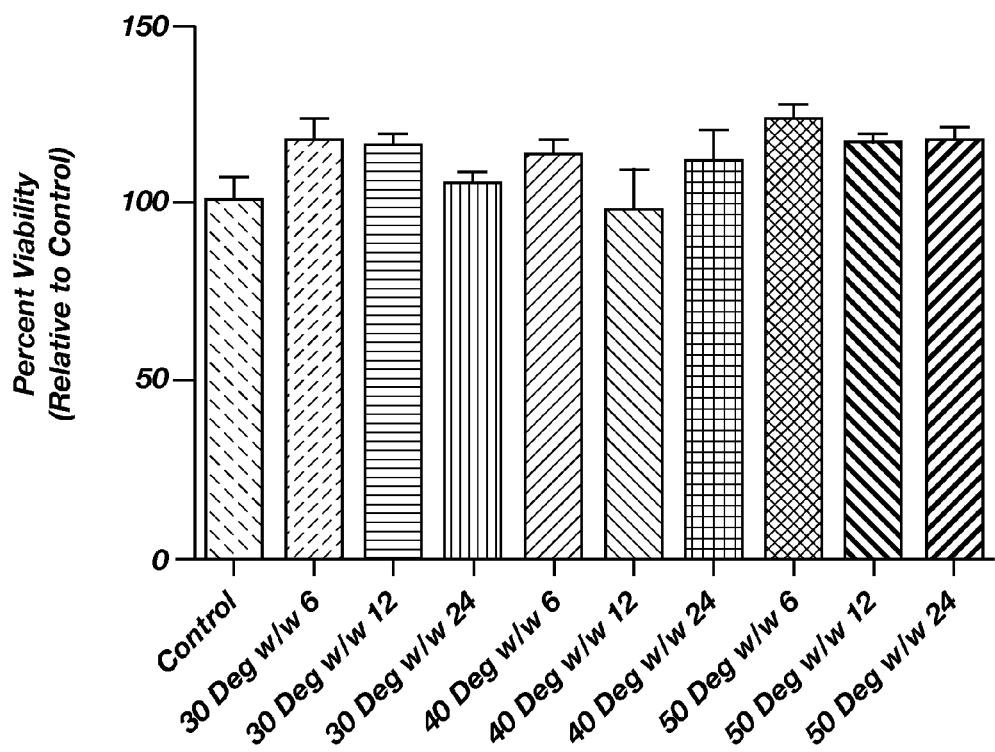
FIG. 5 shows the effect of polymer architecture on cell viability in H9c2 cells. Results are presented in the same order as in FIG. 4.

H9c2 cells were seeded in a 24-well plate at a density of $4.0 \times 10^4$ cells/well and incubated for 24 hrs. Poly(TETA/CBA)/pBLuc complexes of weight ratios (w/w) of 6, 12, and 24 and no polymer (control) were incubated with the cells for 4 hrs in serum-free medium followed by 20 hrs in complete medium. MTT solution (50 µL, 2 mg/mL) was then added and cells were further incubated for 2 hrs. The medium was removed and 300 µL DMSO was then added to each well. The absorption was measured at 570 nm using a microplate reader (Model 680, Bio-Rad Lab, Hercules, Calif.). The percentage relative cell viability was determined relative to control (untreated) cells, which were not exposed to transfection system and taken as 100% cell viability. All cytotoxicity experiments were performed in triplicate. Results are shown in FIG. 5. Cytotoxicity was essentially nil.

EXAMPLE 4

Poly(TETA/CBA) copolymers prepared according to the procedure of Example 1 were fractionated using ultrafiltration membranes with molecular weight cut offs of 10,000; 5,000; and 1,000. These fractions were termed poly(TETA/CBA(10k)), poly(TETA/CBA(5k)), and poly(TETA/CBA(1k)), respectively.

Figure 6:
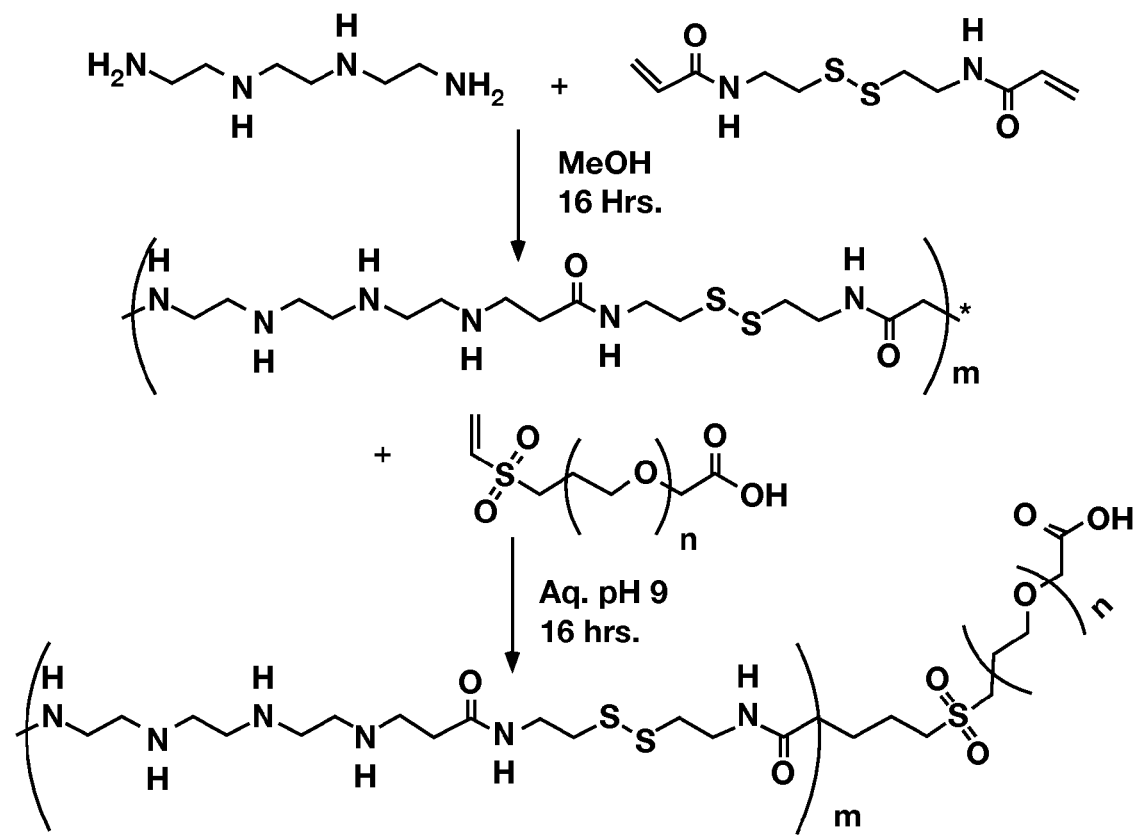
FIG. 6 shows a general synthesis scheme for poly(TETA/CBA) and poly(TETA/CBA)-g-PEG$_{3400}$.

Polyethylene glycol of molecular weight 3,400 (PEG3.4 k or $PEG_{3400}$) was conjugated in equimolar amounts to poly(TETA/CBA(5k)). DPAS was dissolved in dimethylsulfoxide (DMSO) and added dropwise to $NH_2$-PEG-COOH with excess pyridine in DMSO and reacted overnight. Next, dithiothreitol (DTT) was added to the reaction mixture and reacted for 4 hr. The resulting PEG product was then purified by ultrafiltration (1000 MWCO). HS-PEG-COOH and excess divinyl sulfone were dissolved in DMSO as a solvent and reacted overnight. The resulting mixture was purified again by ultrafiltration (1000 MWCO). The resulting PEG product was then dissolved in sodium carbonate buffer, pH 9.0, and added dropwise to the poly(TETA/CBA(5k)) carbonate solution and reacted for 16 hr. For visual clarity, poly(TETA/CBA(5k)) appears linear in FIG. 6, however, it should be noted that the poly(TETA/CBA(5k)) was branched. The product resulting from this reaction was termed poly(TETA/CBA(5k))-$PEG_{3400}$.

Poly(TETA/CBA(1k)), poly(TETA/CBA(5k)), poly(TETA/CBA(10k)), poly(TETA/CBA)5k))-$PEG_{3400}$, and hyperbranched polyethylenimine (bPEI25k; $M_w$=25,000; Aldrich, St. Louis, Mo.) were analyzed by gel permeation chromatography (GPC). Table 1 shows the number average molecular weight ($M_n$), weight average molecular weight ($M_w$), and polydispersity index ($M_w/M_n$; PDI) derived from GPC measurements. Polymer fraction buffer capacity titrations were determined by the moles of HCl required to shift pH from 7.4 to 5.1 in 0.1 M aqueous NaCl. Degree of branching was determined by reduction of each polymer fraction using TCEP and subsequent free sulfhydryl NEM protection as analyzed by MALDI-TOF.

TABLE 1

| Polymer | Mn (kDa) | Mw (kDa) | PDI | Titration (mol HCl) | Degree Branching |
| --- | --- | --- | --- | --- | --- |
| p(TETA/CBA(1k)) | 4.2 | 8.2 | 1.95 | 12.1 | 0.68 |
| p(TETA/CBA(5k)) | 5.8 | 8.8 | 1.53 | 15.0 | 0.90 |
| p(TETA/CBA(10k)) | 12.0 | 13.1 | 1.09 | 13.0 | 0.91 |
| p(TETA/CBA(5k))-$PEG_{3400}$ | 10.2 | 11.8 | 1.16 | 9.80 | — |
| bPEI25k | 16.4 | 21.0 | 1.28 | 35.2 | — |

EXAMPLE 5

The ability of poly(TETA/CBA(1k)), poly(TETA/CBA(5k)), poly(TETA/CBA(10k)), and poly(TETA/CBA(5k))-$PEG_{3400}$ to protect plasmid DNA from serum nucleases was determined.

Figure 7:
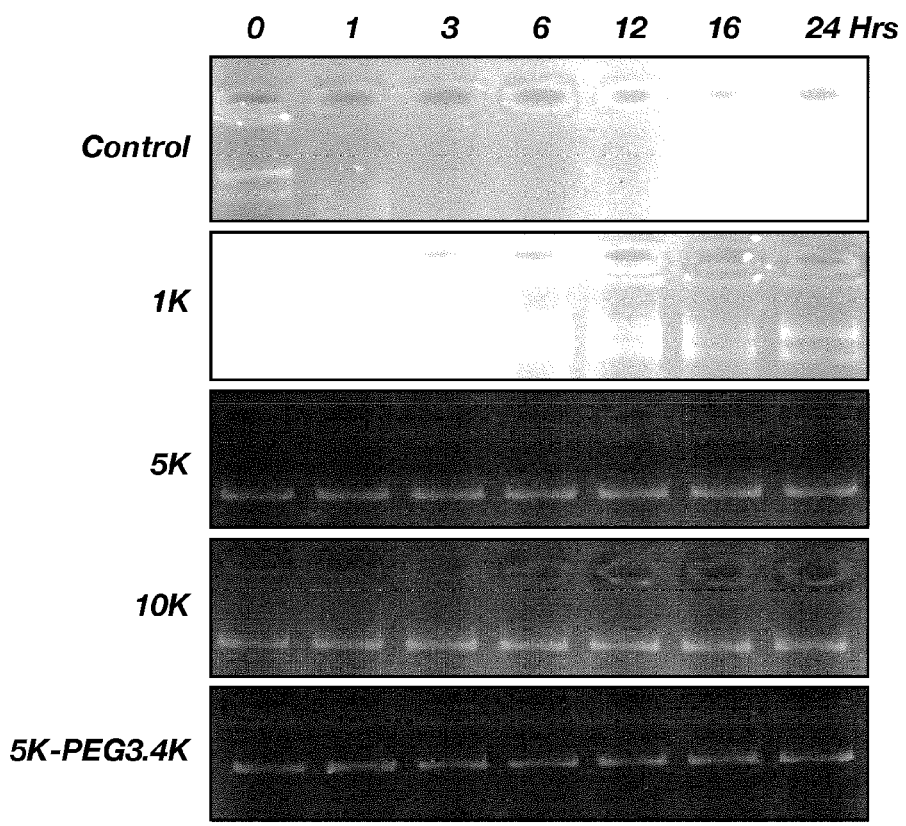
FIG. 7 shows protection of plasmid DNA from serum nucleases in 20% FBS in PBS for up to 24 hours with 1,000 (1K); 5,000 (5K); and 10,000 (10K) molecular weight cut off fractions of poly(TETA/CBA) and the corresponding PEG copolymer (5K-PEG3.4K).

Polyplexes were prepared as described above, except that poly(TETA/CBA(1k)), poly(TETA/CBA(5k)), poly(TETA/CBA(10k)), and poly(TETA/CBA(5k))-$PEG_{3400}$ were used instead of unfractionated poly(TETA/CBA). The polyplexes and a plasmid DNA control (not complexed with a poly(TETA/CBA) polymer) were then exposed to serum nucleases (20% FBS; HyClone, Logan, Utah) for 0, 1, 3, 6, 12, 16, or 24 hours. Then, the polyplexes were subjected to gel electrophoresis (150 ng of pDNA per lane) in TAE buffer (40 mM Tris-HCl, 1% (v/v) acetic acid, 1 mM EDTA). Images were visualized with an image analyzer equipped with UV transilluminator (GelDoc, BioRad, Hercules, Calif.) after ethidium bromide staining. FIG. 7 shows that the polymers successfully protected the plasmid DNA from nuclease degradation for 24 hours.

Figure 8:
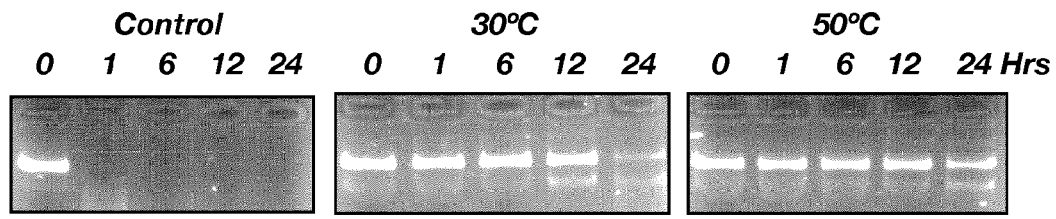
FIG. 8 shows protection of plasmid DNA from serum nucleases by poly(TETA/CBA) synthesized at 30° C. and 50° C., as compared to a control having no poly(TETA/CBA).

In another experiment, control plasmid DNA and polyplexes formed with unfractionated poly(TETA/CBA) synthesized at 30° C. or 50° C. were exposed to serum nucleases in 20% FBS, as described above. FIG. 8 shows that the denser architecture formed at 50° C. provides better protection from serum nucleases than does the architecture formed at 30° C.

EXAMPLE 6

Figure 9:
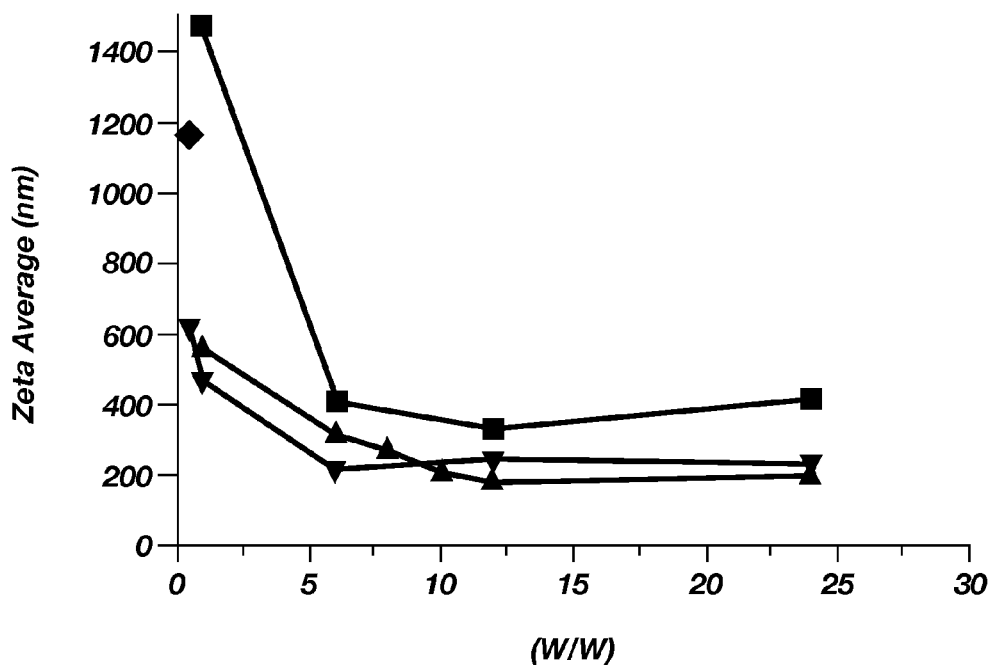
FIG. 9 shows particle sizes of polyplexes formed from plasmid DNA and poly(TETA/CBA(1k)) (■), poly(TETA/CBA(5k)) (▲), poly(TETA/CBA(10k)) (▼), and poly(TETA/CBA(5k))-PEG$_{3400}$ (♦).
Figure 10:
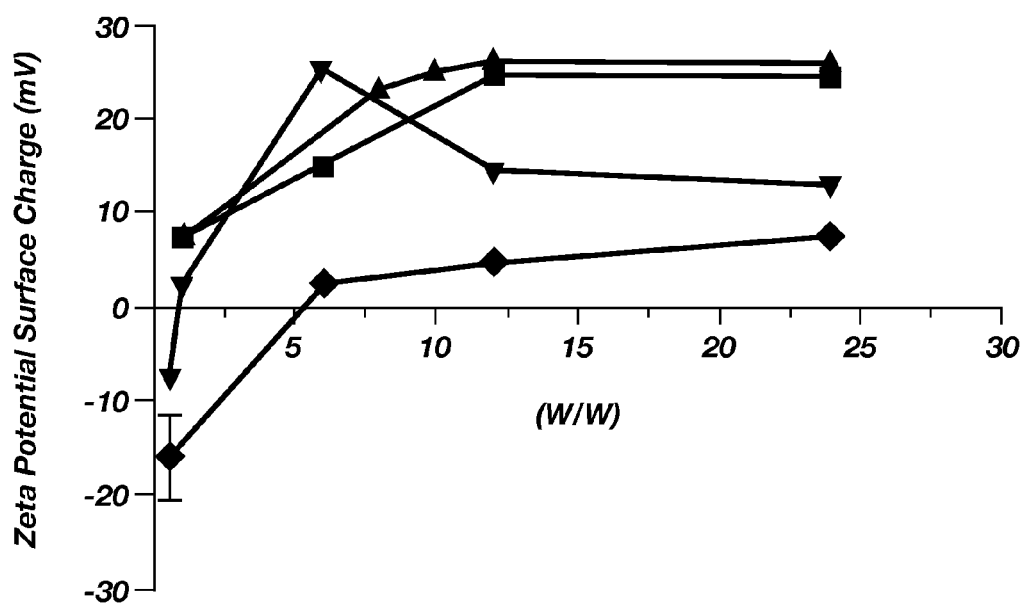
FIG. 10 shows zeta potentials of polyplexes formed from plasmid DNA and poly(TETA/CBA(1k)) (■), poly(TETA/CBA(5k)) (▲), poly(TETA/CBA(10k)) (♦), and poly(TETA/CBA(5k))-PEG$_{3400}$ (♦).

The particle size and zeta potential of polyplexes formed from plasmid DNA and poly(TETA/CBA(1k)), poly(TETA/CBA(5k)), poly(TETA/CBA(10k)), and poly(TETA/CBA(5k))-$PEG_{3400}$ at various w/w ratios were determined on a Brookhaven Instruments Corp. (Holtsville, N.Y.) ZetaPALS. Values for the particle size are effective mean diameters (n=3 SEM). These results are shown in FIGS. 9 and 10.

Figure 11:
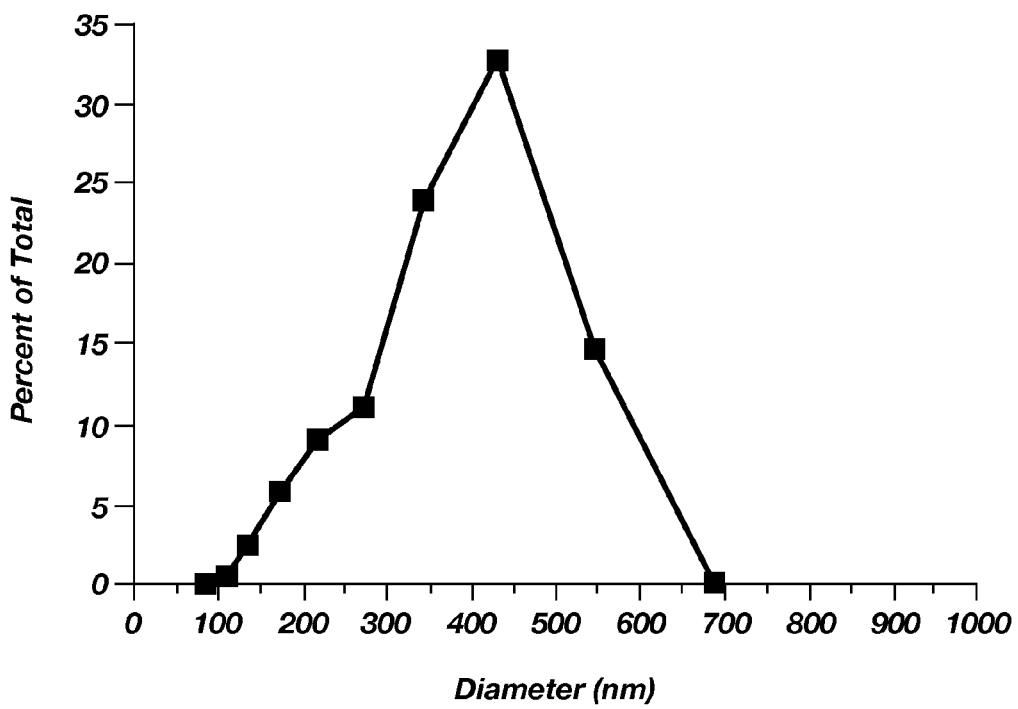
FIG. 11 shows particle diameters measured by dynamic light scattering (DSL) of polyplexes formed from plasmid DNA and poly(TETA/CBA(1k)) synthesized at 40° C.
Figure 12:
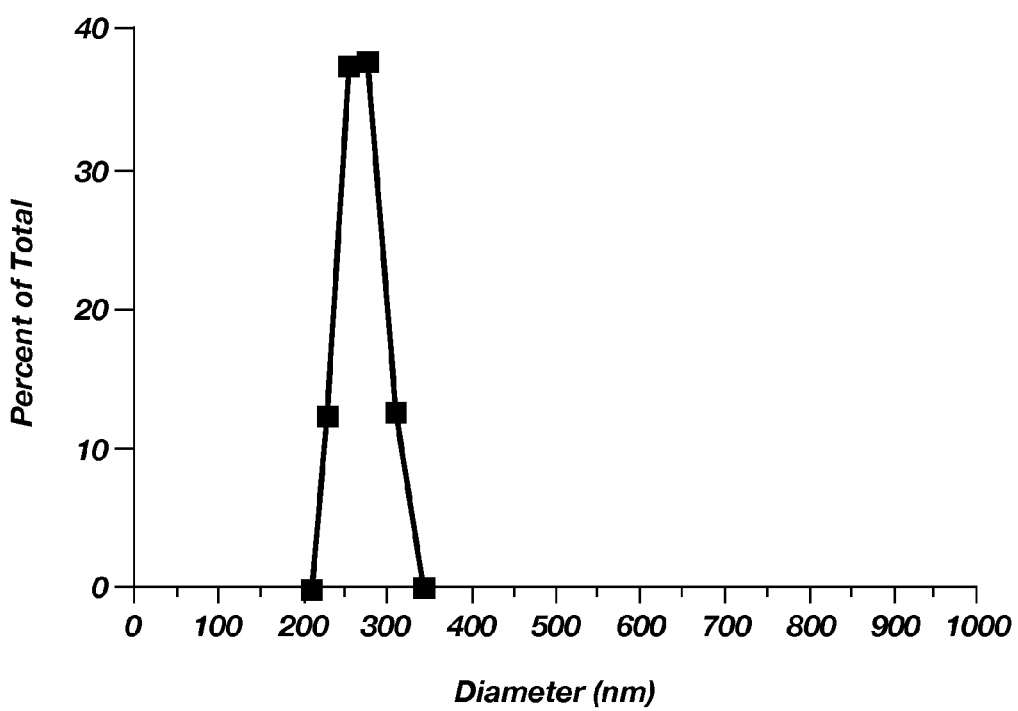
FIG. 12 shows particle diameters measured by dynamic light scattering (DSL) of polyplexes formed from plasmid DNA and poly(TETA/CBA(5k)) synthesized at 40° C.
Figure 13:
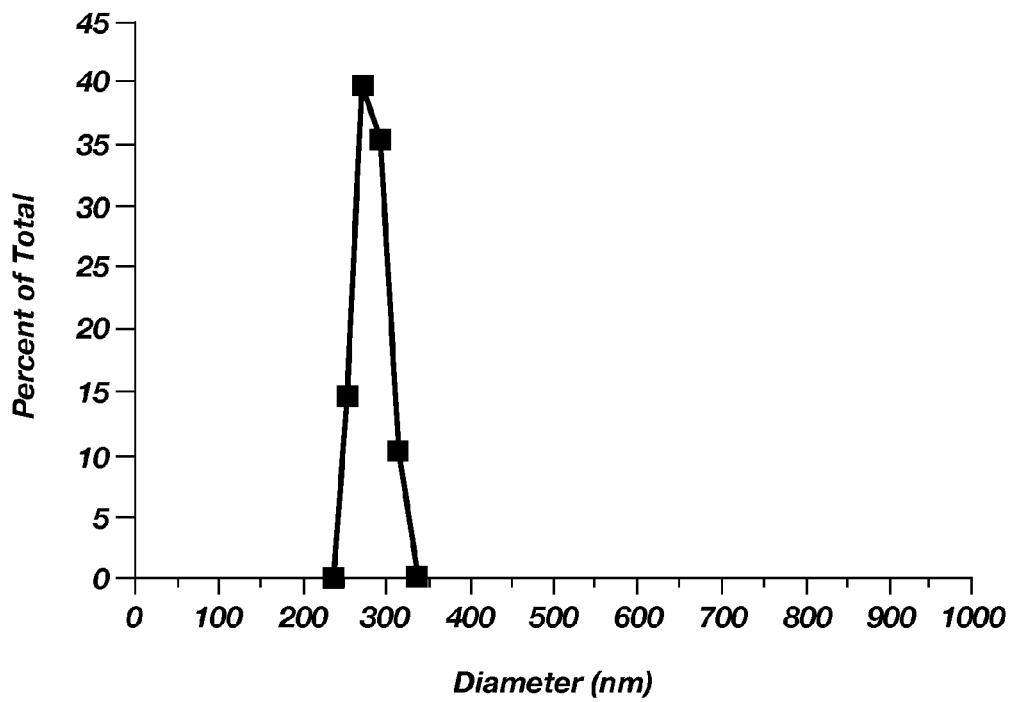
FIG. 13 shows particle diameters measured by dynamic light scattering (DSL) of polyplexes formed from plasmid DNA and poly(TETA/CBA(10k)) synthesized at 40° C.
Figure 14:
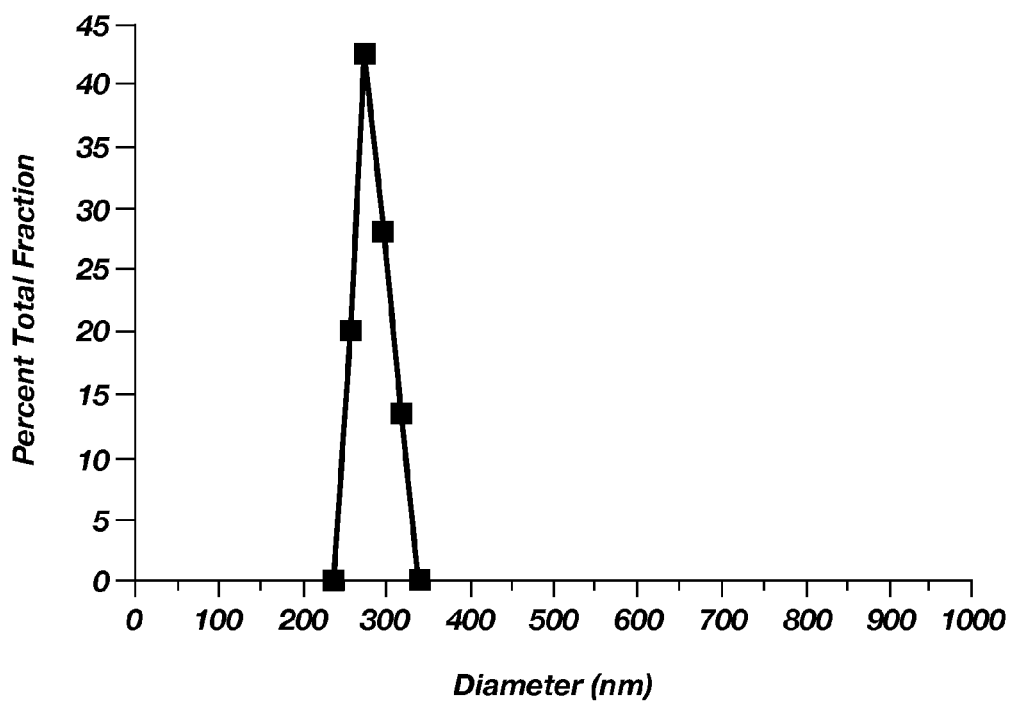
FIG. 14 shows particle diameters measured by dynamic light scattering (DSL) of polyplexes formed from plasmid DNA and poly(TETA/CBA(5k))-PEG$_{3400}$ synthesized at 40° C.

Dynamic light scattering (DLS) measurements determined using poly(TETA/CBA(1k)) (FIG. 11), poly(TETA/CBA(5k)) (FIG. 12), poly(TETA/CBA(10k)) (FIG. 13), and poly(TETA/CBA)5k))-PEG3.4 k (FIG. 14).

EXAMPLE 7

Figure 15:
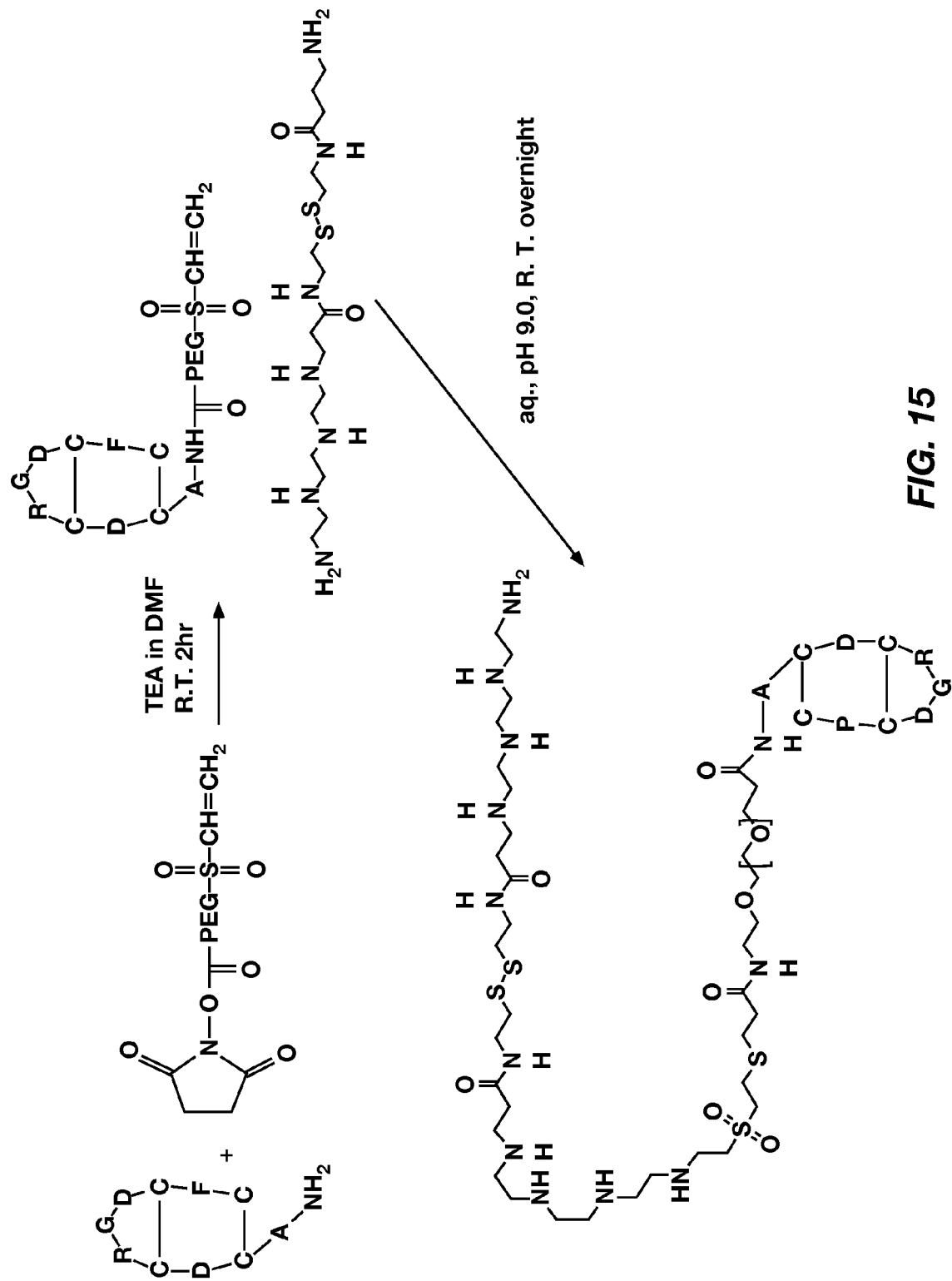
FIG. 15 shows a scheme for synthesis of poly(TETA/CBA)-g-PEG-RGD.

Poly(TETA/CBA)-g-PEG-RGD was synthesized using poly(TETA/CBA) prepared according to the procedure of Example 1 and commercially available vinyl sulfone-PEG-RGD (VS-PEG-RGD). The reaction scheme is illustrated in FIG. 15.

EXAMPLE 8

Figure 16:
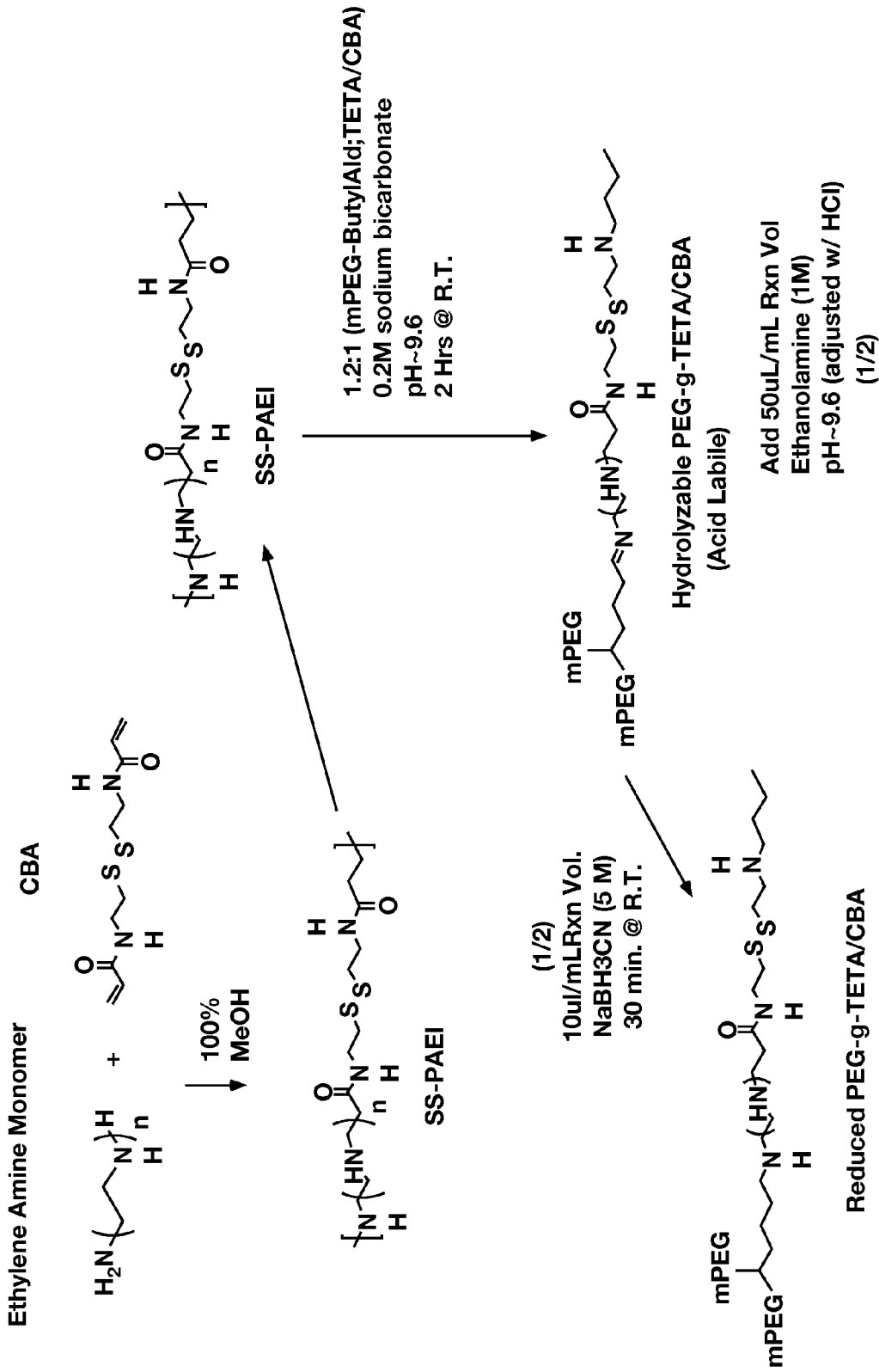
FIG. 16 shows a scheme for synthesis of bPEG-g-poly(TETA/CBA).

Branched PEG products, such as bPEG2000-COH, have been shown to enhance protection of proteins an polymers similar to high molecular weight PEG products. These conjugates have achieved similar results, while maintaining low molecular weights. Branched PEG2000 was conjugated to poly(TETA/CBA) to generate an improved copolymer system for gene delivery. The synthesis of bPEG-g-TETA/CBA is shown in FIG. 16.

EXAMPLE 9

Figure 17:
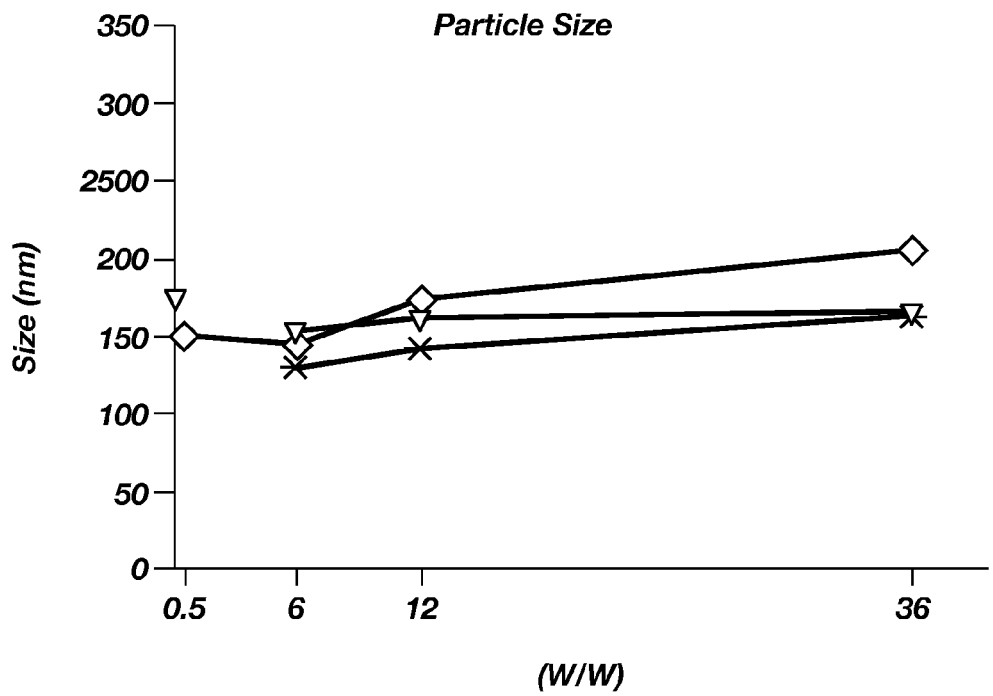
FIG. 17 shows particle sizes of poly(TETA/CBA) (◇), poly(TETA/CBA)-PEG$_{3400}$ (■), and poly(TETA/CBA)-PEG-RGD (▼).
Figure 18:
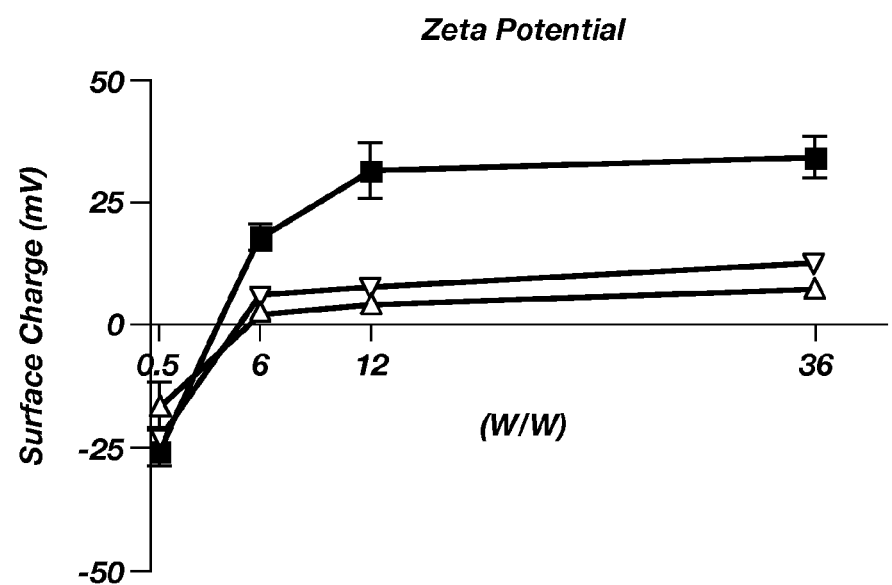
FIG. 18 shows zeta potentials of poly(TETA/CBA) (■), poly(TETA/CBA)-PEG$_{3400}$ (Δ), and poly(TETA/CBA)-PEG-RGD (▼).

The particle sizes and zeta potentials of poly(TETA/CBA), poly(TETA/CBA)-PEG$_{3400}$, and poly(TETA/CBA)-PEG-RGD were determined on a Brookhaven Instruments Corp. (Holtsville, N.Y.) ZetaPALS. Values for the particle size are effective mean diameters. The results are shown in FIGS. 17 and 18.

EXAMPLE 10

Figure 19:
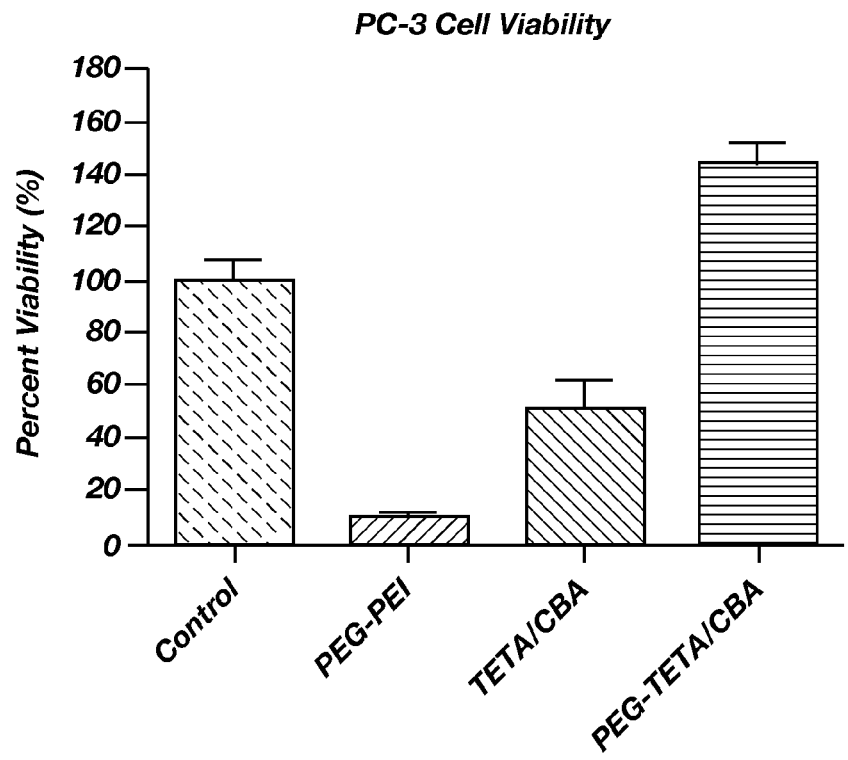
FIG. 19 shows cytotoxicity of poly(TETA/CBA) and bPEG-poly(TETA/CBA) as compared to PEG-PEI and control.

PC-3 cells were seeded in a 24-well plate at a density of $4.0 \times 10^4$ cells/well and incubated for 24 hrs. Poly(TETA/CBA), poly(TETA/CBA)-PEG$_{3400}$ and controls PEG-PEI and no polymer were incubated with the cells for 4 hrs in serum-free medium followed by 20 hrs in complete medium. MTT solution (50 µL, 2 mg/mL) was then added and cells were further incubated for 2 hrs. The medium was removed and 300 µL DMSO was then added to each well. The absorption was measured at 570 nm using a microplate reader (Model 680, Bio-Rad Lab, Hercules, Calif.). The percentage relative cell viability was determined relative to control (untreated) cells, which were not exposed to transfection system and taken as 100% cell viability. All cytotoxicity experiments were performed in triplicate. Results are shown in FIG. 19.

EXAMPLE 11

Figure 20:
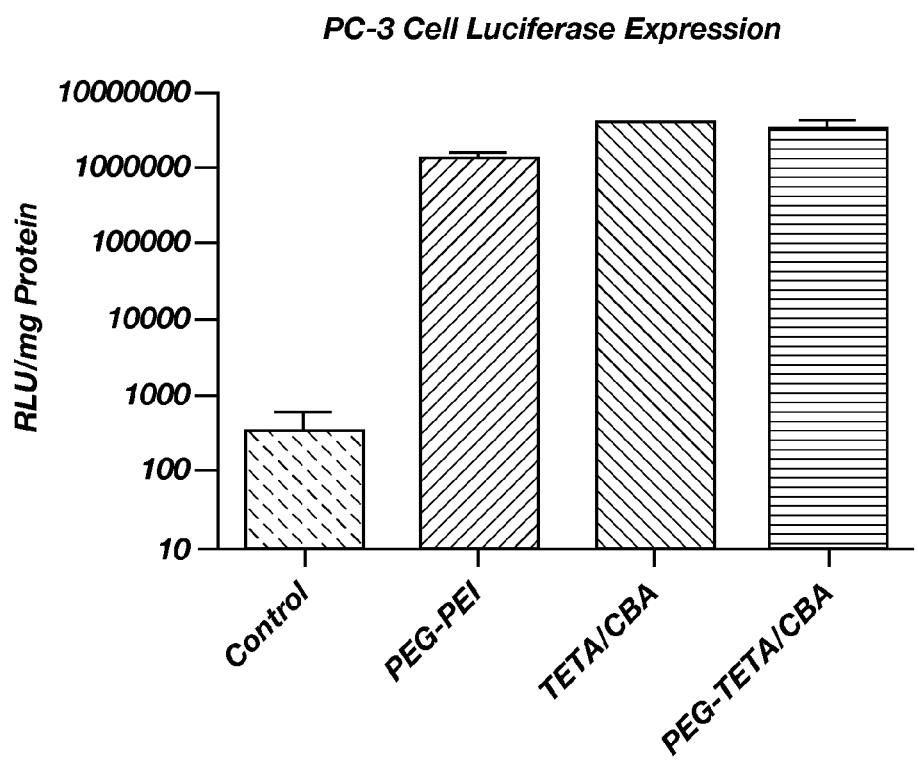
FIG. 20 shows transfection as measured by luciferase expression for poly(TETA/CBA) and bPEG-poly(TETA/CBA) as compared to PEG-PEI and control.

Transfection was evaluated on PC-3 cells using the plasmid, pCMV-Luc, as a reporter. Cells were maintained in DMEM containing 10% FBS, streptomycin (100 µg/mL) and penicillin (100 units/mL) at 37° C. in a humidified atmosphere with 5% CO$_2$. Cells were seeded 24 hrs prior to transfection in 24-well plates at initial densities of $4.0 \times 10^4$ cells/well. DNA was complexed with the poly(TETA/CBA) and PEG-poly(TETA/CBA) polymers. Controls were PEG-PEI and no polymer. Complexes were made in HEPES buffer and incubated for 30 min before use. At the time of transfection, the medium in each well was replaced with fresh serum-free medium. Polyplexes (0.5 µg DNA/well) were incubated with the cells for 4 hrs at 37° C. The medium was then replaced with 500 µL of fresh complete medium and cells were incubated for additional 44 hrs. The cells were then washed with pre-warmed PBS, treated with 200 µL cell lysis buffer and subjected to a freezing-thawing cycle. Cellular debris was removed by centrifugation at 14,000 g for 5 min. The luciferase activity in cell lysates (25 µL) was measured using a luciferase assay kit (100 µL luciferase assay buffer) on a luminometer (Dynex Technologies Inc., Chantilly, Va.). The relative luminescence unit (RLU) of luciferase expression was normalized against protein concentration in the cell extracts, measured by a BCA protein assay kit (Pierce, Rockford, Ill.). All transfection assays were carried out in triplicate. Results are shown in FIG. 20.

The subject matter claimed is:

1. A composition comprising:

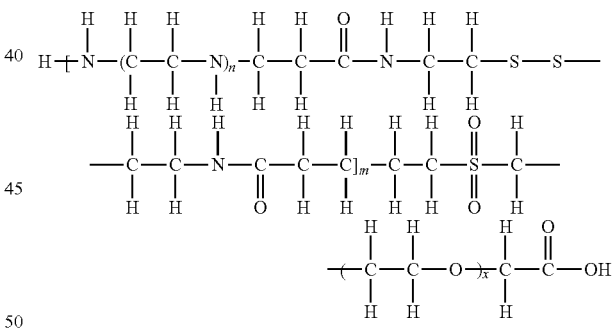

wherein n is 1, 2, or 3; and m and x are positive integers.

2. The composition of claim 1 wherein the (CH$_2$—CH$_2$—O)$_x$ moiety has a molecular weight of about 1,000 to about 50,000.

3. The composition of claim 2 wherein the (CH$_2$—CH$_2$—O)$_x$ moiety has a molecular weight of about 2,000 to about 25,000.

4. The composition of claim 3 wherein the (CH$_2$—CH$_2$—O)$_x$ moiety has a molecular weight of about 3,400.

5. The composition of claim 1 wherein the H—[HN—(CH$_2$—CH$_2$—N)$_n$—CH$_2$—CH$_2$—CO—NH—CH$_2$—CH$_2$—S—S—CH$_2$—CH$_2$—NH—CO—CH$_2$—CH$_2$]$_m$—H moiety has a molecular weight of about 1,000 to about 25,000.

6. The composition of claim 1 further comprising an RGD peptide covalently bonded to the COOH moiety.

7. The composition of claim 6 where the RGD peptide comprises SEQ ID NO: 1.

8. A complex comprising a nucleic acid ionically bonded to a composition comprising:

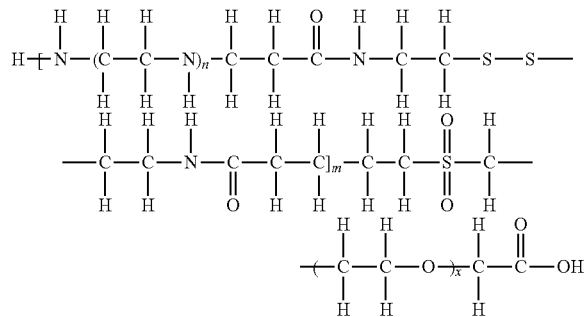

wherein n is 1, 2, or 3; and m and x are positive integers.

9. The composition of claim 8 wherein the $(CH_2-CH_2-O)_x$ moiety has a molecular weight of about 1,000 to about 50,000.

10. The composition of claim 9 wherein the $(CH_2-CH_2-O)_x$ moiety has a molecular weight of about 2,000 to about 25,000.

11. The composition of claim 10 wherein the $(CH_2-CH_2-O)_x$ moiety has a molecular weight of about 3,400.

12. The composition of claim 8 wherein the $H-[HN-(CH_2-CH_2-N)_n-CH_2-CH_2-CO-NH-CH_2-CH_2-S-S-CH_2-CH_2-NH-CO-CH_2-CH_2]_m-H$ moiety has a molecular weight of about 1,000 to about 25,000.

13. The composition of claim 8 further comprising an RGD peptide covalently bonded to the COOH moiety.

14. The composition of claim 8 where the RGD peptide comprises SEQ ID NO: 1.

15. A composition comprising:

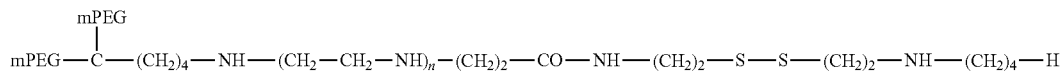

wherein n is 1, 2, or 3.

* * * * *